US006991783B2

(12) United States Patent
Santoiemmo

(10) Patent No.: US 6,991,783 B2
(45) Date of Patent: *Jan. 31, 2006

(54) ABSORBENT, DEODORIZING, HYGIENIC ANIMAL BEDDING COMPOSITION AND METHOD OF MANUFACTURE

(75) Inventor: Carl V. Santoiemmo, Willoughby Hills, OH (US)

(73) Assignee: Hunt Club Animal Bedding, LLC, Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/184,297

(22) Filed: Jun. 27, 2002

(65) Prior Publication Data

US 2002/0176839 A1    Nov. 28, 2002

Related U.S. Application Data

(63) Continuation of application No. 09/036,301, filed on Mar. 6, 1998, now Pat. No. 6,436,384.

(51) Int. Cl.
  *A61L 11/00*   (2006.01)
(52) U.S. Cl. .................. 424/76.6; 424/76.5; 424/76.8; 424/406; 424/421; 424/683; 424/684; 119/526; 71/61; 71/62
(58) Field of Classification Search ................ 424/76.1, 424/76.21, 76.5–76.9, 404, 403, 406–414, 424/421, 125, 683, 684, 694, 724; 119/526; 71/61, 62
See application file for complete search history.

(56) References Cited

U.S. PATENT DOCUMENTS

| 2,708,418 A | 5/1955 | Sugarman |
| 3,255,762 A | 6/1966 | Baier |
| 4,376,422 A | 3/1983 | Whitehead et al. |
| 4,437,429 A | 3/1984 | Goldstein et al. |
| 4,465,019 A | 8/1984 | Johnson |
| 4,938,155 A | 7/1990 | Williams |
| 5,133,296 A | 7/1992 | Crawford |
| 5,189,987 A | 3/1993 | Stanislowski et al. |

(Continued)

FOREIGN PATENT DOCUMENTS

DE    200 04 472 U    6/2000

(Continued)

OTHER PUBLICATIONS

Horse Journal vol. 8 #8 Hunt Club, Aug. 2001.*

(Continued)

*Primary Examiner*—Neil S. Levy
(74) *Attorney, Agent, or Firm*—MacCord Mason PLLC

(57) ABSTRACT

An animal bedding composition and method of manufacture includes cut or shredded pieces of multiple panel corrugated cardboard kraft paper structures having an internal corrugated panel sandwiched between outer panels, and an adsorptive deodorizing ion exchange agent such as a zeolite dispersed throughout the cardboard pieces and carried on outer and inner surfaces of the pieces of cardboard and on outer and inner surfaces of the corrugations to provide a comfortable, hygienic and deodorized floor covering for animal stalls. An automated method of manufacturing the animal bedding composition is also described. The ion exchange agent attaches to surfaces of the corrugated cardboard which serves as a carrier to sanitize and deodorize a stall. The open structure of the cut corrugations provides mechanical load absorption, and a wicking action to aerate moisture from a stall. The ion exchange agent carried by the corrugated pieces removes ammonia odor from urine and provides slow release potassium and, when loaded with ammonium, slow release of nitrogen for agricultural fertilization. Carbon in the kraft paper from which the corrugated cardboard is constructed attracts nitrogen from urine, yielding excellent fertilizing material with rapid biodegradation.

10 Claims, 2 Drawing Sheets

U.S. PATENT DOCUMENTS

| | | | |
|---|---|---|---|
| 5,195,465 A | 3/1993 | Webb et al. |
| 5,209,186 A | 5/1993 | Dewing |
| 5,265,561 A | 11/1993 | Crawford |
| 5,352,780 A | 10/1994 | Webb et al. |
| 5,372,314 A | 12/1994 | Manning |
| 5,456,737 A | 10/1995 | Manning |
| 5,510,310 A | 4/1996 | Manning |
| 5,634,431 A | 6/1997 | Reddy et al. |
| 6,436,384 B2 | 8/2002 | Santoiemmo |

FOREIGN PATENT DOCUMENTS

| | | |
|---|---|---|
| EP | 0307229 | 3/1989 |
| GB | 2254769 | 10/1992 |
| GB | 2 261 586 A | 5/1993 |
| GB | 2261856 | 5/1993 |
| JP | 7206051 | 8/1995 |
| WO | WO 99/44647 | 9/1999 |

OTHER PUBLICATIONS

Interim Decision on Great Britain Patent No. 2,261,856 dated Mar. 17, 1997.

Decision on Great Britain Patent No. 2,261,856 dated Jul. 11, 1997.

Steelhead Specialty Minerals, Sweet PDZ Product Description, Aug., 2001.

* cited by examiner

ABSORBENT, DEODORIZING, HYGIENIC ANIMAL BEDDING COMPOSITION AND METHOD OF MANUFACTURE

PRIORITY CLAIM

This application is a continuation and claims the benefit of U.S. patent application Ser. No. 09/036,301 filed on Mar. 6, 1998 now U.S. Pat. No. 6,436,384 the entirety of which is hereby incorporated by reference.

FIELD OF THE INVENTION

The present invention relates generally to animal bedding materials and more specifically to synthetic or preprocessed materials which provide a comfortable stall floor covering, and control moisture, dust and odor in animal housing environments. The invention also relates to methods of making and packaging animal bedding materials and compositions.

BACKGROUND OF THE INVENTION

In a typical managed care facility for large animals such as horses, cows, etc., stalls are provided for occupancy by one or more animals at a time. A critical element of the stall is the flooring or bedding material, as animals spend many hours in a stall as a place for feeding and resting. Stall floors are typically dirt or concrete or, more recently, rubberized mats. Traditionally, straw or hay is distributed over the flooring to provide a softer surface and some very limited absorption of animal waste. In fact, straw and hay are not very absorbent, do not have adequate cushioning, and after mixing with animal waste become very slippery. Stall floors lined with organic materials such as straw or hay provide a breeding ground for various fungi which can cause respiratory and hoof infections, and induce allergic reactions in animals and humans. Furthermore, straw and hay do not perform any deodorizing or odor reducing function. Additives such as hydrated lime have been used with straw and hay as an ammonia/odor control agent. Lime has the disadvantages of high toxicity and is therefore relatively hazardous, low relative ammonia removal and high relative pH/high alkalinity, rendering the discarded stall material unsuitable for use as a fertilizer. Another disadvantage of straw and hay is the large amount of dust produced when these materials are applied to stall floors. This dust is inhaled by the animals causing irritation to the respiratory tract, making them more susceptible to the harmful effects of ammonia inhalation. This is particularly harmful to young animals that spend much of their time laying on stall floors where the dust accumulates. Dust is also unsanitary and hazardous and to the breeding and birthing processes.

Alternatively, a number of different materials, organic and inorganic, have been proposed for use as animal bedding material. Among these materials are cardboard, shredded paper such as recycled newsprint, wood shavings and mixtures of these materials. However, a number of disadvantages arise from use of these alternative materials. For instance, shredded paper is quickly saturated with animal urine and solid waste. It becomes matted and heavy and thus difficult to remove from the stall. Bedding material made from wood shavings, on the other hand, provides support and comfort, but has limited absorption characteristics and can contribute to fungal growth. Wood shavings are also slow to biodegrade and thus are unsuitable for use as fertilizer. An additional disadvantage of wood shavings is that the individual pieces get tangled in the hair, mane and tail of horses and other animals, making cleaning and grooming arduous.

An additional shortcoming of these prior art animal bedding materials is that they do not impede ammonia production in stalls where animals are housed. Even in small concentrations, ammonia can pose a health problem to animals. It has been shown that atmospheric ammonia is damaging to the respiratory tract. Even relatively low concentrations of ammonia can diminish airway defense mechanisms, making animals more vulnerable to pneumonia and asthma-like symptoms, leading to a higher incidence and increased severity of pneumonia, particularly in young animals. Lower weight gains have been observed in animals kept in stalls with ammonia concentrations as low as 25 ppm. Moreover, these materials offer no odor masking or odor reduction properties. The odors also attract flies and other insects which can carry disease and further stress the animals.

U.S. Pat. No. 5,209,186 describes an absorbent animal bedding material of nodules of cellulose material made from paper pulp produced from waste paper. These nodules have a smooth, hard, porous surface and resist breakage during use and handling. However, this material does not support the weight of large animals like horses and cows and creates dust when crushed. The nodules are crushed by the weight of these large animals, substantially reducing the amount of support and cushion provided by the bedding material. Also, this material is not easily or economically produced and requires numerous manufacturing steps and expensive mixing and heating equipment. Like the materials described above, this animal bedding material does not reduce ammonia production or odor.

U.S. Pat. No. 5,372,314 discloses an animal bedding material produced by mixing finely shredded cellulose material with calcium oxide and water to form a slurry. The slurry is then neutralized by mixing it with diatomaceous earth or a non-swelling clay and dried to form the animal bedding material. This animal bedding material is absorbent, but does not inhibit ammonia production and provides no relief from the unpleasant odor produced from animal waste.

U.S. Pat. Nos. 5,195,465 and 5,352,780 each describe a litter material made from compacted cellulose which has been formed into pellets and flaked. Both of these patents suggest adding fungicides, coloring agents, insecticides and herbicides to the flaked material to extend the life of the litter and reduce bacterial and fungal growth. However, neither patent offers a solution to the odor and ammonia production problems associated with other prior art animal bedding materials.

It has also been suggested in U.S. Pat. Nos. 5,133,296 and 5,265,561 to combine waste cardboard and wood pallets to make animal bedding material. However, the addition of the wood to the cardboard substantially decreases the biodegradability of this material making the bedding material essentially useless as fertilizer after it has become saturated with animal waste. Although wood chips are still used on stall floors, they must be kept separate from straw or hay for disposal as recycling fertilizer. Compost haulers will not accept stall waste which includes wood chips. Stall waste disposal is a critical issue, particularly with large animal care facilities such as zoos, racetracks, and horse farms. A stall material which cannot be economically disposed of cannot be used. This fact eliminates any material which contains wood or any other slow degrading material. Thus, a stall material is needed that performs hygienic and ergonomic functions in the stall, and a biodegradable fertilizing function in waste form has not been provided. Like the previously described prior art animal bedding materials, this approach offers no solution to the odor and ammonia production problem associated with conventional animal bedding materials.

SUMMARY OF THE PRESENT INVENTION

To overcome these and other disadvantages of the prior art, it is an object of the present invention to provide an inexpensive and effective comfortable, absorbent and deodorizing material that is useful as an animal bedding or stall floor lining material. It is a further object of the invention to provide such a material that is essentially dust free and inhibits the production of ammonia and reduces the unpleasant odor in areas where animals are housed. It is still a further object of the present invention to provide an efficient method of mass producing an animal bedding material composition having superior ammonia and odor reduction properties. It is still a further object of the invention to provide a stall floor covering composition which when soiled with animal waste provides a rapidly biodegradable fertilizer with high nitrogen content ready for immediate application by agricultural growers.

The present invention is directed to an improved animal bedding material having superior cushioning properties and ammonia and odor reduction function. In the preferred embodiment of the invention, the animal bedding material is comprised of strips or pieces of shredded corrugated cardboard combined with an ion exchange agent. The ion exchange agent may be an ammonia adsorbent material in powderized form. The strips of corrugated cardboard are formed by cutting sheets of cardboard into strips so that the corrugations between parallel outer panels remain intact. The strips or pieces are then mixed with the ion exchange agent so that it is distributed on the outer and inner surfaces of the cardboard strips and inside the corrugations of the cardboard. The corrugated air-containing structure of the cardboard pieces provides cushioning and shock absorption which relieves stress on animal hooves and legs, and promotes healing of lame animals without the need for expensive alternate stall flooring such as rubber mats.

The animal bedding material of the present invention is produced by feeding sheets of cardboard into a shredding or cutting device that performs at least two different cutting operations. In one such device, a first set of blades cuts the sheets of cardboard into strips which are then cut with a second set of blades to a desired length. Paper fiber dust is removed from the strips or pieces by a vacuum system, and the pieces are combined with an ion exchange agent in powder or particulate form. The bedding material composition is then packaged in a sealed container or bag for delivery to a stall and distributed directly upon a stall floor.

DETAILED DESCRIPTION OF PREFERRED AND ALTERNATE EMBODIMENTS

Figure 1:
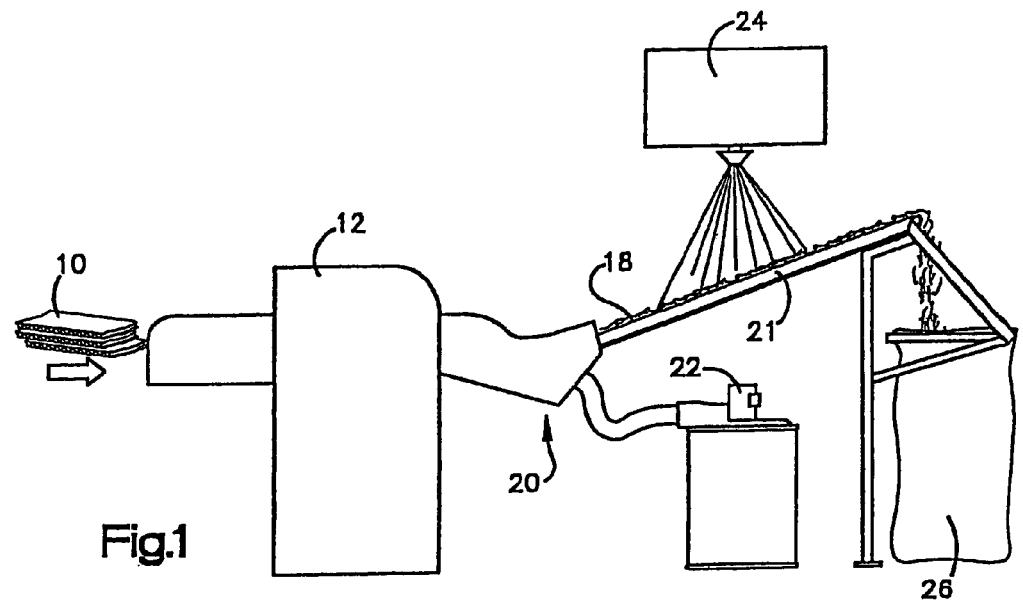
FIG. 1 is a diagrammatic view of apparatus for producing an animal bedding composition according to the method of the present invention.
Figure 2:
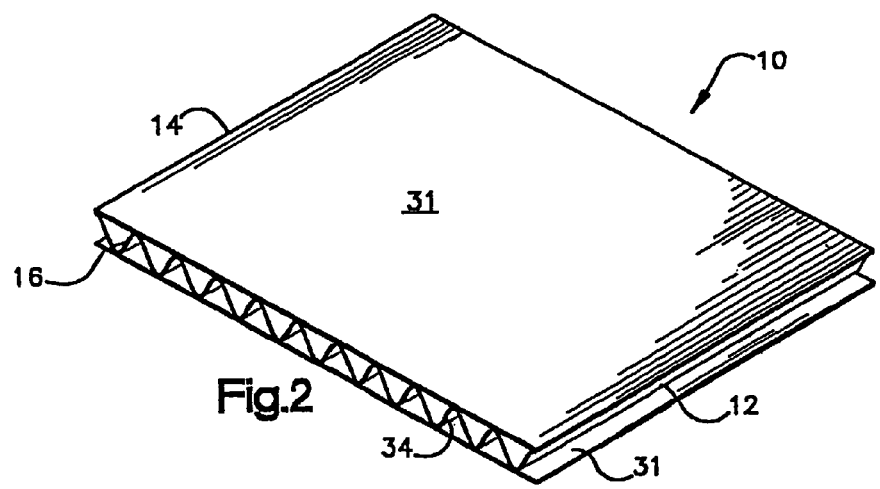
FIG. 2 is a perspective view of a sheet of corrugated cardboard used to make the animal bedding composition of the present invention.

Referring to FIGS. 1 through 4, an animal bedding composition and a method of making the animal bedding composition of the present invention is illustrated. A sheet of corrugated cardboard material 10 is provided. As shown in FIG. 2, the sheet of cardboard is comprised of a first edge 12, a second edge 14, and a plurality of corrugations 16. The corrugations 16 are generally parallel to the first edge 12 and the second edge 14 and extend the length of the sheet of corrugated cardboard 10. The cardboard 10 may be new or recycled stock of two panel sandwiched corrugations ranging in total thickness from approximately $\frac{1}{16}$" to $\frac{1}{2}$". The outer panels are preferably kraft paper (a tough paper made from sulfate wood pulp) or other fibrous cellulosic material ranging in thickness from approximately $\frac{1}{32}$" to approximately $\frac{1}{8}$". The internal corrugated layer, known as fluting, is also preferably made of kraft paper or other fibrous, cellulosic material with a flute height, as measured from one interior side of an overlying panel to an opposing side of a parallel overlying panel, in a range of approximately $\frac{1}{16}$" to $\frac{1}{4}$". Preferably, the corrugated cardboard used for the composition of the invention is a C-flute size of approximately $\frac{3}{16}$" height. Although shown with corrugations 16 in a general sinusoidal form, other configurations of the internal layer are possible, or any other structure which creates an air gap between the outer panels, as further described herein.

Figure 4:
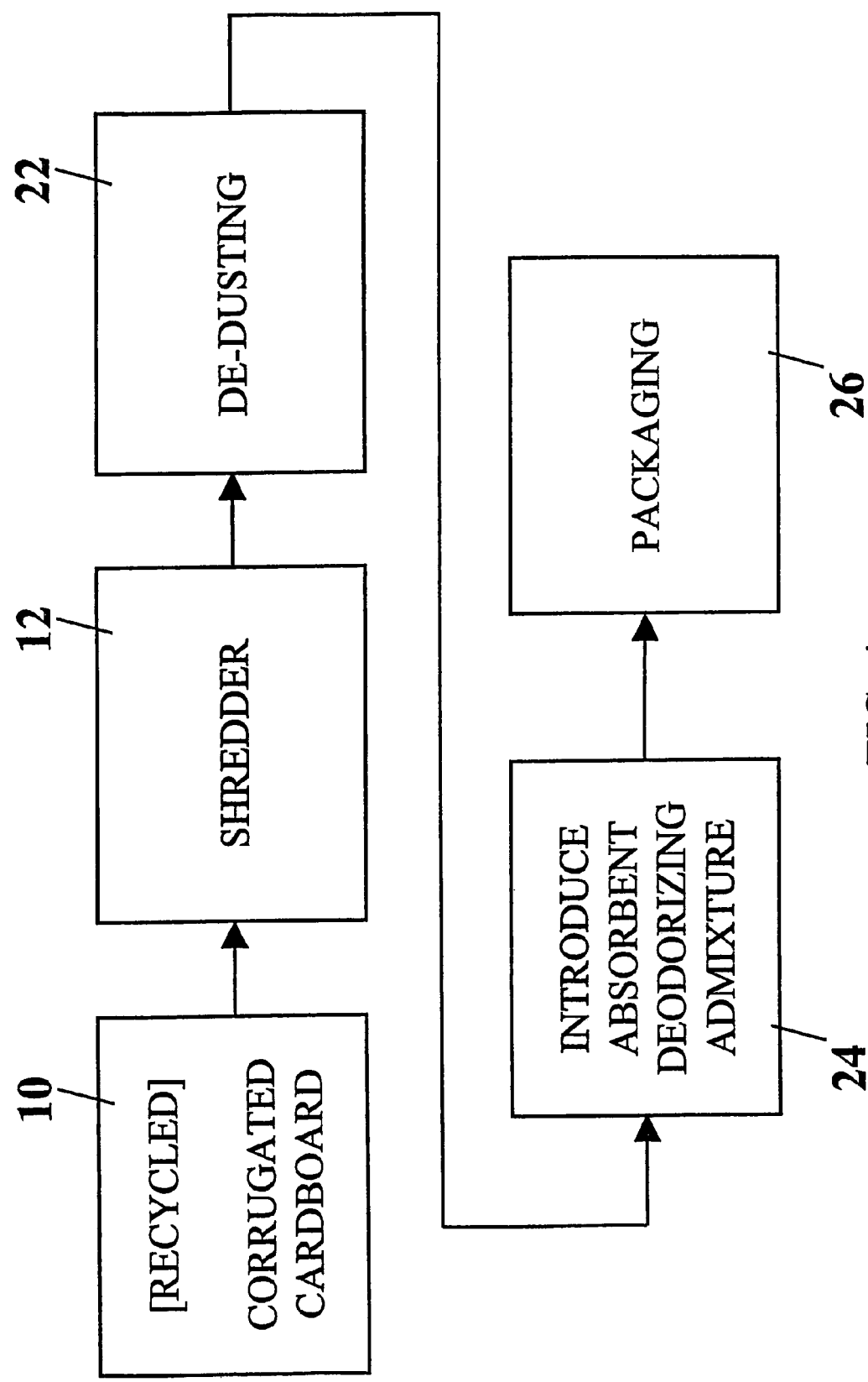
FIG. 4 is a block diagram of a manufacturing process for producing the animal bedding composition of the present invention.

With reference to FIGS. 1 and 4, one or more sheets of corrugated cardboard 10 is fed into a shredder 12. One type of shredding device which can be used in the method of this invention is the Cross Shred manufactured by Industrial Paper Shredders, Inc. of Salem, Ohio. However, other brands of shredders or other types of cutting devices may be used. The Cross Shred is capable of accepting cardboard sheets having a maximum width of about 20 inches and incorporates a two blade cutting system which first cuts the cardboard sheet into strips with a width in an approximate range of $\frac{1}{8}$ inch to 1 inch or greater, and then chops or cuts the strips into particles having a length in an approximate range of $\frac{1}{4}$ inch to about 1 inch or greater. The sheets of corrugated cardboard 10 are fed into the shredder 12 with the corrugations 16 generally perpendicular to a first set of blades in the shredder 12. Sheets of corrugated cardboard 10 may be fed individually into the shredder, or a plurality of sheets may be stacked and fed simultaneously into the shredder 12. Using the Cross Shred machine, it is preferred that no more than three stacked sheets of corrugated cardboard 10 be fed into the shredder at a time. If more than three sheets of corrugated cardboard 10 are fed into the Cross Shred, the corrugations may be crushed, thus diminishing the shock absorption and wicking aeration action of the corrugated cardboard as further described herein. However, other cutting or shredding devices may allow more than three sheets of corrugated cardboard to be cut simultaneously without crushing the internal corrugated layer. The sheets of corrugated cardboard are cut into strips of about $\frac{3}{8}$ inch in width. The $\frac{3}{8}$ inch wide strips are then cut into pieces 18 having a length of about $\frac{1}{2}$ inch to about 1 inch.

The pieces 18 then exit the shredder 12 at the exit point 20 and are transferred to a conveyor belt 21. A vacuum system 22 is provided at an exit point 20 from the shredder to remove and collect any paper fiber dust particles resulting from the shredding of the cardboard 10. The pieces 18 are then transferred by conveyor belt 21 to mixing containers 26 and mixed with an ion-exchange additive in powder form as may be applied from a dispensing device 24 positioned proximate to conveyor 21 whereby the additive is disposed on the pieces 18 and inside the corrugations 16. The dispensing device 24 may be shrouded to contain the powder particulates of the ion exchange agent as it is applied to the pieces. In a mass production set-up, containers 26 may be supported on a moving carousel or conveyor so that once a container is filled, it is automatically advanced to a closing or sealing station whereat the container or bag is sealed and removed from the conveyance and palletized for shipment.

One particular form of an ion-exchange agent which has been discovered to be especially well-suited for the inventive composition is one or more forms of the natural substance zeolite. Zeolites are naturally occurring volcanic minerals or synthesized materials which contain hydrogen, oxygen, aluminum and silicon arranged in a three-dimensional interconnecting lattice structure. Zeolites have the ability to selectively adsorb specific gas molecules and the ability to reversibly adsorb and desorb water. One particular form of zeolite, clinoptilolite is most preferred for use in the present invention due to its high selectivity for ammonium ions. However, other zeolites such as synthetic zeolites F and W may be used. Clinoptilote is non-toxic, edible and easily digested and has been used as a food supplement for cattle and swine to improve metabolism and lessen bloating. As such, it is safe and does not pose the health problems associated with other odor control additives such as lime. Ammonium ions are adsorbed by the clinoptilolite, reducing the amount of airborne ammonia typically found in areas where animals are housed. The reduction of airborne ammonia reduces respiratory distress it is proven to cause.

Zeolites, and in particular clinoptiloite, also have excellent agricultural fertilization properties. This is critical to the success of a stall material as it must be economically disposed of. In other words, acceptance of used stall material by agricultural growers is required in order for a stall material to be used in large quantities. Clinoptilolite is high in potassium as major exchangeable cation, providing slow release potassium, and nitrogen when pre-loaded with ammonium.

Preferably, the containers 26 are filled with pieces 18 to about 50% of capacity and about 50% of a predetermined amount of ion exchange agent in powder form is added to the pieces 18. The containers 26 are then completely filled with pieces 18 and the remaining ion exchange agent powder is mixed in. The ion exchange agent can alternatively be distributed on the pieces 18 using a sifting mechanism as the pieces 18 are moved along conveyor belt 21. A preferred form of the animal bedding composition may have from about ½ ounces to about 8 ounces of clinoptilolite per 3 cubic feet of pieces 18, preferably from about 1 ounce to about 3 ounces of clinoptilolite per 3 cubic feet of pieces 18.

Figure 3:
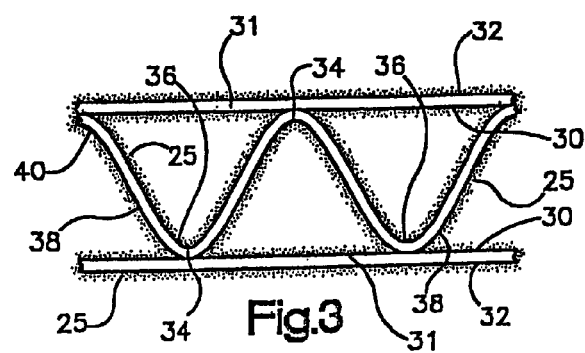
FIG. 3 is a cross sectional view of a single piece of the animal bedding composition of the present invention.

FIG. 3 shows a piece 18 of the animal bedding composition. As used herein, the term "composition" means the combination of the cardboard pieces and the particles 25 of the ion exchange agent. As illustrated, a corrugated cardboard structure includes outer generally parallel panels 31 with inner surfaces 30 and outer surfaces 32, and an inner panel 40 having a plurality of corrugations 34. The corrugations 34 each have a first surface 36 and a second surface 38. The height of the corrugations 34 from one inner surface 30 to the opposing inner surface 30 of panels 31 dictates the thickness of the cardboard structure. For purposes of practicing the invention, a corrugated cardboard structure with a relatively greater or increased thickness is preferred. Increased thickness provides a mechanical benefit of shock and pressure absorption, and provides a greater amount of internal surface area as a carrier structure for a powderized form of an ion exchange additive represented schematically, not to scale, as particles 25. The particles 25 are, through mechanical mixture, carried by and attached to the corrugated cardboard pieces 18 to form the composition.

The ion exchange agent particles 25 are disposed on the inner and outer surfaces 30 and 32, and on the inside and outside surfaces 36 and 38 of the corrugations 34. As explained, the preferred ion exchange agent is zeolite, and the most preferred zeolite is clinoptilolite. Clinoptilolite is preferred due to its excellent ammonia adsorption capability. When the zeolite is mixed with the corrugated pieces 18, and distributed on the inner and outer surfaces 30 and 32, and on the inside and outside surfaces 36 and 38 of the corrugations 34, the absorption properties of the cardboard are combined with the adsorption properties of the zeolite. Moisture is absorbed by the cardboard and adsorbed by the zeolite. This combined moisture absorption/adsorption is further combined with the mechanical cushioning and shock absorption of the corrugated structure. Further, it has been discovered that there is sufficient mechanical bonding between the adsorbent, deodorizing zeolite material and the external and internal surfaces of a corrugated cardboard structure such that the cardboard acts as both a carrier and distributor of the adsorbent, deodorizing zeolite material throughout the area of distribution of the shredded particles. It has also been discovered that, in the animal stall application as described, the corrugated cardboard structure provides a hydrodynamic wicking action to aerate and evaporate moisture from the stall floor. As the pieces 18 become wet, the air gaps between the outer panels 31 and the inner corrugated layer 34 allow air to pass through each piece to evaporate moisture. The presence of the zeolite within the air gaps of the pieces 18 increases the amount of ammonium ion exchange which occurs, thus maximizing the reduction of ammonia odor and respiratory distress.

When the composition is distributed about a stall floor, a substantial amount of the zeolite remains disposed on all surfaces of each piece 18. It is desirable that a portion of the zeolite also fall on the stall floor. Part of the animal waste is absorbed by the shredded cardboard and part of the waste works its way through the bedding material to the stall floor. The zeolite on the stall floor adsorbs ammonium from the waste that has fallen to the stall floor. The bedding material acts as a wick, slowing absorbing waste from the stall floor. The corrugations allow for air flow and slow drying, so that the pieces do not mat together.

The animal bedding composition can be spread upon a stall floor in any thickness, such as approximately 2 inches or up to 10 inches or greater depending on the type of animals housed. For example, in stalls for show or race horses, it is desirable to have a thicker layer of bedding to provide more support and cushion. The composition is periodically remixed or agitated in the stall to redistribute both the cardboard pieces and the particulates of ion exchange agent. When the composition becomes soiled with animal waste, it is collected and used as an agricultural fertilizer in direct soil applications. For example, when a portion of the composition within a stall is soiled, it is removed by pitch fork or shovel in the ordinary manner of "mucking out". The removal composition is replaced by a fresh supply of equal quantity. The soiled composition is ideally suited as a fertilizer for growing vegetables and especially mushrooms. This is due to the high carbon content of the kraft paper of which the corrugated cardboard is constructed and the excellent fertilizing properties of zeolite as a slow release of nitrogen and potassium. The carbon bonds to nitrogen present in urine, thus the urine soaked bedding composition is a nitrogen-rich fertilizer. As mentioned, critical to the superior performance of the composition as a vegetable and mushroom fertilizer is the absence of wood shavings which are not as rapidly biodegradable as cardboard. Stall materials which contain wood shavings are not acceptable to agricultural growers. Thus, wood shavings when used in stalls must be kept segregated from other materials.

The animal bedding composition of the invention is easier to spread on stall floors than the prior art bedding materials. Unlike hay and straw, the cardboard pieces do not clump together. As such, it is not necessary to separate the pieces after the material is poured onto the stall floor. This also makes the waste removal or "mucking out" procedure simpler. Because the individual pieces of the bedding material do not stick together, the animal waste separates from the bedding material more readily. As a result, relatively less material is needed to replenish the bedding. Also, the resulting waste is less bulky than with other bedding materials because a relatively large amount of the bedding material remains on the stall floor after the animal waste is removed.

Accordingly, the preferred and alternate embodiments of the present invention have been described. With the foregoing description in mind, however, it is understood that this description is made only by way of example, that the invention is not limited to the particular embodiments described herein, and that various rearrangements, modifications and substitutions may be implemented without departing from the true spirit of the invention as hereinafter claimed.

What is claimed is:

1. An animal bedding composition for distribution within an animal stall consisting essentially of:
   (a) a carrier which is formed from a plurality of shredded recycled corrugated cardboard pieces, being formed of first and second parallel stock panels separated by internal stock fluting to form a plurality of air gaps between the first and second panels; and
   (b) a zeolite ion exchange agent in particulate form for adsorbing ammonia ions, said ion exchange agent mixed with the shredded corrugated cardboard pieces whereby the ion exchange agent is mechanically bonded on the inner and outer surfaces of the first and second panels and the surface of the internal stock fluting of the corrugated cardboard pieces, whereby said bedding provides mechanical cushioning and shock absorption to an animal housed in said stall and hydrodynamic wicking action to aerate and evaporate urine from the stall floor.

2. The animal bedding of claim 1 wherein the cardboard pieces have a length of approximately ⅛ inch to 1 inch and a width of approximately ¼ inch to ¾ inch.

3. The animal bedding composition of claim 1 wherein the stock fluting of the corrugated cardboard has a height dimension in a range of approximately ⅛ inch to about ½ inch.

4. The animal bedding composition of claim 1 wherein the zeolite is clinoptilolite.

5. The animal bedding composition of claim 1 comprising between about ½ ounces to about 8 ounces of ion exchange agent and about 3 cubic feet of corrugated cardboard pieces.

6. The animal bedding composition of claim 1 wherein the corrugated cardboard is constructed of kraft paper.

7. The animal bedding composition of claim 1 wherein the corrugated cardboard and ion exchange agent are combined in an approximate ratio of 1 to 10 ounces of ion exchange agent per 3 to 6 cubic feet of corrugated cardboard pieces.

8. An animal bedding composition for use as a covering for an animal stall floor to provide cushioning relatively free from fibrous dust particles, moisture absorption and adsorption, and odor control, and to further provide a ready-to-apply agricultural fertilizer when used in waste form in combination with animal waste, including urine, the animal bedding composition comprising:
   (a) a carrier which is formed from a plurality of pieces of kraft paper in a multiple panel structure formed of first and second parallel stock panel separated by internal stock fluting to form a plurality of air gaps between the first and second panels; and
   (b) a zeolite ion exchange agent in a particulate form for adsorbing ammonia ions, said ion exchange agent mixed with the pieces and substantially in contact with all surfaces of the pieces, whereby the ion exchange agent is carried by the pieces when distributed upon a stall floor, and air and moisture within a stall contacts the kraft paper of the pieces and the ion exchange particulates on the pieces providing a moisture and odor reduction process.

9. The animal bedding composition of claim 8 wherein the ion exchange particulates are present on the internal and external surfaces of the kraft pieces, and excess ion exchange particulates are carried by the pieces for distribution upon a stall floor.

10. The animal bedding composition of claim 8 wherein the pieces of kraft paper are cut in a configuration in which the stock fluting which separates the outer first and second parallel panel is preserved.

* * * * *